B. URSO.
AUTOMOBILE SIGNAL.
APPLICATION FILED FEB. 26, 1918.
1,293,255.
Patented Feb. 4, 1919.
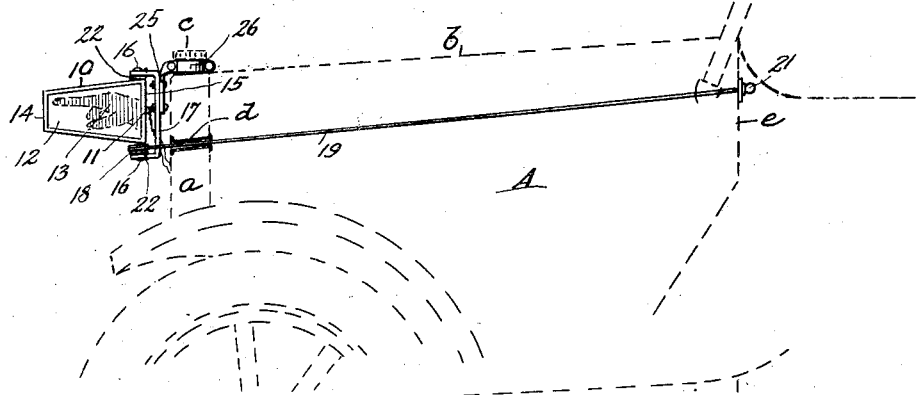
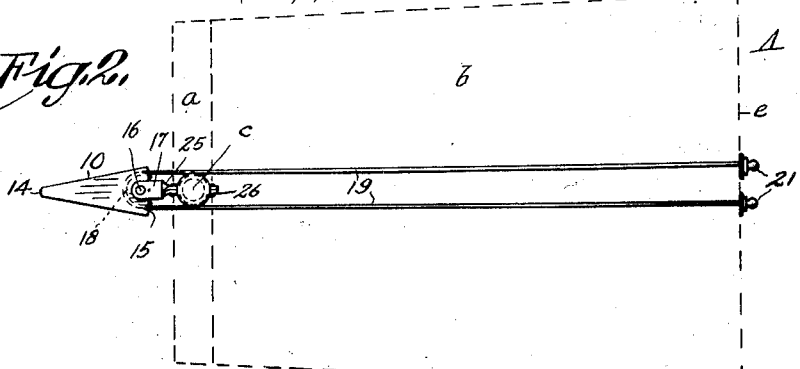
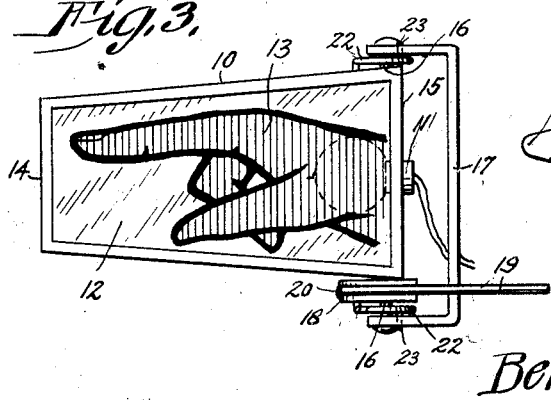
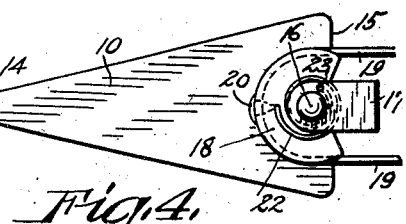
INVENTOR
Benedetto Urso
WITNESSES
R. W. Hoagland
BY
ATTORNEY

UNITED STATES PATENT OFFICE.

BENEDETTO URSO, OF FAIRMONT, WEST VIRGINIA, ASSIGNOR TO URSO AUTO SIGNAL COMPANY, INC., OF FAIRMONT, WEST VIRGINIA, A CORPORATION OF WEST VIRGINIA.

AUTOMOBILE-SIGNAL.

1,293,255.

Specification of Letters Patent.

Patented Feb. 4, 1919.

Application filed February 26, 1918. Serial No. 219,269.

*To all whom it may concern:*

Be it known that I, BENEDETTO URSO, a subject of the King of Italy, residing at Fairmont, in the county of Marion and State of West Virginia, have invented certain new and useful Improvements in Automobile-Signals, of which the following is a specification.

This invention relates to a signal device for attachment to the front of an automobile to indicate to the public the direction in which the car is to move, particularly when approaching a corner, and is so constructed as to be visible both day and night and of such a simple character as to be readily applicable for adjustment to automobiles of all makes.

A further object of the invention is to provide a traffic signal for an automobile which may be readily attached or detached to the neck of the radiator at the front of the car and which is provided with means extending rearwardly through the engine hood to the interior of the car and within convenient reach of the operator for the purpose of turning the signal to right or left in response to the intention to steer the car in the direction indicated.

With the above as the principal objects in view, the invention consists in the novel construction, combination and arrangement of parts hereinafter described, pointed out in the appended claim and illustrated in the accompanying drawings, in which, Figure 1 is a side elevation of a portion of an automobile with the traffic signal in position thereon, the automobile being indicated in dotted lines.

Fig. 2 is a top plan view of the parts illustrated in Fig. 1.

Fig. 3 is an enlarged side elevation of the signal proper and the carrying bracket therefor, and, Fig. 4 is a bottom view of the signal vane or target and means for turning the same to the right and left.

In the drawings, 10 indicates the vane or signal target for indicating the direction of movement of the vehicle A to which it is applied. The vane or target in the present instance is in the form of a casing to receive an illuminant such as an electric light bulb 11 and having transparent or translucent sides 12 on which are painted or otherwise applied a direction indicator 13 such as a hand, arrow or other device. The casing 10 is preferably of a double wedge shape, the sides converging in a forward direction to form a pointed end 14, while the rear end is somewhat broad and is provided with an opening for the passage therethrough of the lamp 11. Projecting from the top and bottom of the target 10 near the rear end 15 are two pintles 16, in line with each other and pivotally mounted in a yoke piece 17 fixed to the vehicle A in position to enable the target to swing to the right or left of the vehicle.

Attached to the lower pintle 16 is a peripherally grooved sector or pulley 18 around which passes a flexible operating means 19, here shown as a cable or wire fastened at 20 to the sector and leading rearwardly through the radiator $a$ and engine hood $b$ to the instrument board within the vehicle and there provided with knobs or handles 21 for operating the target.

For the purpose of maintaining the target in the central line of the vehicle under normal conditions, or when traveling in a straight line, springs 22 are provided which, being tensioned to operate in opposite directions and connected to the target and to the yoke piece 17, hold the target yieldingly in a central position, but will readily permit movement to the right or left when one or the other of the knobs 21 on the flexible connection 19 is pulled. The springs 22 are shown in the present instance as helical, one end 23 of each being secured to the yoke 17 while the opposite ends are fastened to the target 10 either directly as shown at the top of the target in Fig. 3 or to the sector 18 at the bottom where an indirect connection is made to the target.

One means for securing the yoke to the target is shown in Figs. 1 and 2 and is in the form of a bracket 25 riveted or bolted on the rear of the yoke at the top thereof and extending backwardly from the yoke and fitted with a clamp 26 for embracing the neck of the filling tube $c$ of the radiator. This clamp is made in two parts in a well-known manner which are separable and so permit quick and easy means for mounting and dismounting the signal.

In using the device on an automobile, the clamp 26 is attached to the neck of the filling tube $c$ of the radiator $a$ in such manner that the target 10 will project forwardly in front of the radiator *a* at the top thereof and close to the same. Cables, wires, or other connecting means 19 extend from the sector 18 rearwardly through the radiator which is provided with guide tubes *d* and through the hood *b* of the engine to the interior of the automobile where the flexible connection terminates in knobs 21 mounted on the instrument board *e*. The springs 22 are of equal power and tensioned to act in opposite directions and so balance each other under normal conditions and hold the target pointing directly forward of the vehicle. When either of the connecting wires or cables 19 is pulled, it is evident the target will be turned toward that side of the vehicle and so increase the tension of one of the springs as to destroy the balance between the two springs 22. Upon releasing the wire or cable 19 this over-tensioned spring reacts and returns the target to its median position.

From the above it will be apparent that a simple signal for automobiles has been provided which may be applied to automobiles of all types by removable connecting means secured to the filling tube of the radiator and which will operate under all conditions and with little or no attention on the part of the operator. By using the balance springs, the target will, when released from the pulley action of the flexible connection, always return to the median position and be maintained in such position by the balanced property of the two springs.

Having described my invention, I claim:—

In a signal of the type describ 1, the combination with a target having pintles projecting upward and downward from its rear corners, and a peripherally grooved sector fast on one pintle; of a yoke in whose arms said pintles are journaled, a spring connecting the upper arm with the top of said target, a spring connecting the lower arm with said sector, said springs being tensioned in opposition to each other and adapted to hold the target normally forward, a flexible operating element secured in the groove of said sector and leading to a remote point, and a bracket attached to said yoke and having a two-part clamp for engagement with the radiator filling tube of an automobile.

In testimony whereof I affix my signature in presence of two witnesses.

BENEDETTO URSO.

Witnesses:
M. L. STURM,
F. R. BROHM.